United States Patent
Iwatsuka et al.

(10) Patent No.: US 11,886,328 B2
(45) Date of Patent: Jan. 30, 2024

(54) TEST INFORMATION EXTRACTION APPARATUS, TEST INFORMATION EXTRACTION METHOD AND PROGRAM

(71) Applicant: NIPPON TELEGRAPH AND TELEPHONE CORPORATION, Tokyo (JP)

(72) Inventors: Takuya Iwatsuka, Tokyo (JP); Haruto Tanno, Tokyo (JP); Toshiyuki Kurabayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/772,095

(22) PCT Filed: Oct. 28, 2019

(86) PCT No.: PCT/JP2019/042170
§ 371 (c)(1),
(2) Date: Apr. 26, 2022

(87) PCT Pub. No.: WO2021/084581
PCT Pub. Date: May 6, 2021

(65) Prior Publication Data
US 2022/0374343 A1 Nov. 24, 2022

(51) Int. Cl.
*G06F 11/36* (2006.01)
*G06F 9/455* (2018.01)
*G06F 21/57* (2013.01)
*G06F 9/445* (2018.01)

(52) U.S. Cl.
CPC ............... *G06F 11/3684* (2013.01)

(58) Field of Classification Search
CPC ............ G06F 11/3644; G06F 11/3636; G06F 11/3612; G06F 11/3684; G06F 11/3664; G06F 9/4486
See application file for complete search history.

(56) References Cited

U.S. PATENT DOCUMENTS 10,210,076 B2 * 2/2019 Huang ................ G06F 11/3684

FOREIGN PATENT DOCUMENTS

| JP | 2010267266 A | 11/2010 |
|----|--------------|---------|
| JP | 2018073223 A | 5/2018 |
| JP | 2019101889 A | 6/2019 |

OTHER PUBLICATIONS

Kurabayashi et al. (2018) "Automatically Generating Test Scripts for GUI Testing" 2018 IEEE International Conference on Software Testing, Verification and Validation Workshops, Apr. 9, 2018.

* cited by examiner

*Primary Examiner* — Thuy Dao (57) ABSTRACT

A test information extraction device improves efficiency in testing applications by including: an obtainment unit that obtains, from a first source code group of an application that implements methods corresponding to requests of a plurality of types received via a network, first information used for generating the requests; and an extraction unit that specifies, from among the methods implemented in response to the requests, a method being a caller of a method included in a second source code group being a part of the first source code group and that further extracts, from the first information, second information used for generating one of the requests corresponding to the specified method.

12 Claims, 7 Drawing Sheets

Fig. 6

TEST INFORMATION EXTRACTION APPARATUS, TEST INFORMATION EXTRACTION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/042170, filed on 28 Oct. 2019, the disclosure of which is hereby incorporated herein by reference in its entirety.

TECHNICAL FIELD

The present invention relates to a test information extraction device, a test information extraction method, and a program.

BACKGROUND ART

In recent years, to promptly provide services that can accommodate diversified consumers' needs, there is an increasing tendency in development styles where software is developed in a short cycle so that services can be released frequently. In this type of development, because the codes are modified frequently, there are needs for a capability to perform a test only on sections where the codes were modified, so as to enable a prompt release.

Existing techniques include, for instance, a technique (e.g., Non-Patent Literature 1) by which a test (e.g., a test to arrive at different screens of an application in a comprehensive manner) for an entire application (e.g., a web application) is generated while automatically analyzing and crawling the application.

CITATION LIST

Non-Patent Literature

Non-Patent Literature 1: Toshiyuki Kurabayashi, Muneyoshi Iyama, Hiroyuki Kirinuki, Haruto Tanno: "Automatically Generating Test Scripts for GUI Testing", 1st IEEE Workshop on NEXt level of Test Automation (NEXTA 2018), April 2018.

SUMMARY OF THE INVENTION

Technical Problem

However, when the abovementioned existing technique is used, because a large number of tests are generated by analyzing the entire application, problems arise as described below, for example.

A first problem is related to analysis time and test execution time. More specifically, it takes a long time to analyze the entire application. Further, because the generated tests are for the purpose of testing the entire application, the number of the tests so large, which require a lot of efforts during the execution of the tests. In addition, selecting only necessary test cases also requires a lot of efforts. As a result, these factors increase the possibility of not being able to release the software promptly.

A second problem is related to preparing an execution environment. To be more specific, because the existing technique requires a dynamic analysis, it is necessary to prepare an execution environment, which requires a lot of efforts.

In view of the circumstances described above, it is an object of the present invention to improve efficiency in testing applications.

Means for Solving the Problem

To solve the abovementioned problems, a test information extraction device includes: an obtainment unit that obtains, from a first source code group of an application that implements methods corresponding to requests of a plurality of types received via a network, first information used for generating the requests; and an extraction unit that specifies, from among the methods implemented in response to the requests, a method being a caller of a method included in a second source code group being a part of the first source code group and that further extracts, from the first information, second information used for generating one of the requests corresponding to the specified method.

Effects of the Invention

It is possible to improve the efficiency in testing applications.

DESCRIPTION OF EMBODIMENTS

The following will describe embodiments of the present invention with reference to the drawings. One of the present embodiments discloses a test information extraction device 10 that automatically extracts information used for testing only modified sections of source codes of a certain application, only by statically analyzing the source codes. Here, the certain application denotes an application that implements methods corresponding to requests of a plurality of types received via a network. More specifically, with respect to an application based on a Model-View-Controller (MVC) model (e.g., a web application structured in the Spring framework), the test information extraction device 10 analyzes the codes and extracts the information used for testing the modified sections of the source codes, by following the procedure described below:

(1) Obtain all the controllers in the post-modification source codes and information for executing the controllers from the outside.
(2) Specify controllers executing modified sections of the source codes and extract information used for testing the modified sections in a pinpoint manner, on the basis of the specified result and the information obtained in (1) presented above.

Figure 1:
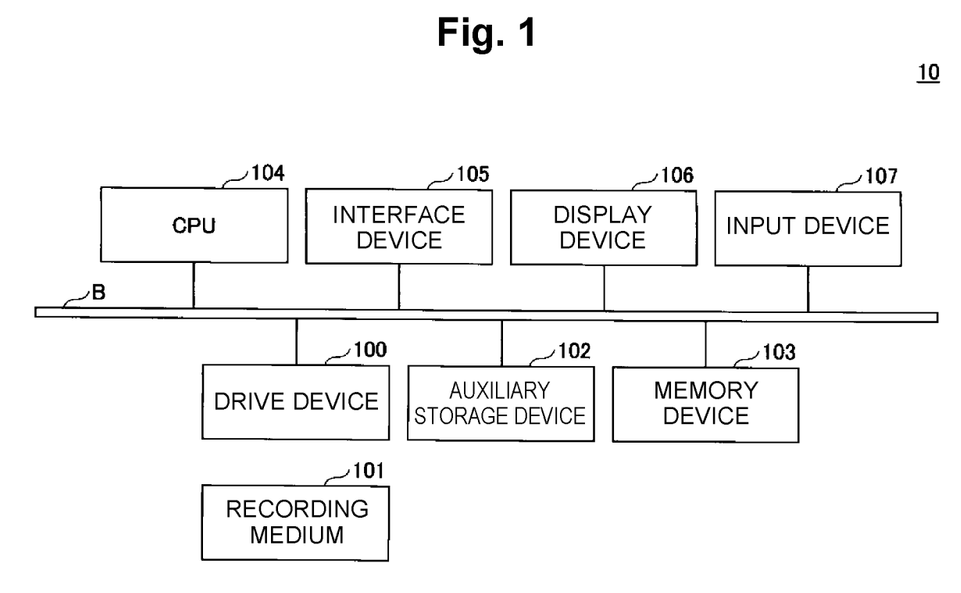
FIG. 1 is a diagram showing an example of a hardware configuration of a test information extraction device 10 according to an embodiment of the present invention.

FIG. 1 is a diagram showing an example of a hardware configuration of the test information extraction device 10 according to an embodiment of the present invention. The test information extraction device 10 in FIG. 1 includes, among others, a drive device 100, an auxiliary storage device 102, a memory device 103, a CPU 104, an interface device 105, a display device 106, and an input device 107 that are connected to one another by a bus B.

A program that realizes processes performed by the test information extraction device 10 is provided in a recording medium 101 such as a CD-ROM. When the recording medium 101 storing the program therein is set on the drive device 100, the program is installed in the auxiliary storage device 102 from the recording medium 101 via the drive device 100. However, the program does not necessarily have to be installed from the recording medium 101 and may be downloaded from another computer via a network. The auxiliary storage device 102 stores therein the installed program, as well as necessary files and data, and the like.

Upon instruction to start up the program, the memory device 103 reads the program from the auxiliary storage device 102 and stores therein the read program. The CPU 104 realizes functions related to the test information extraction device 10 according to the program stored in the memory device 103. The interface device 105 is used as an interface for connecting to a network. The display device 106 displays a Graphical User Interface (GUI) provided by the program and the like. The input device 107 is structured with a keyboard and a mouse or the like and is used for having various types of operation instructions input.

Figure 2:
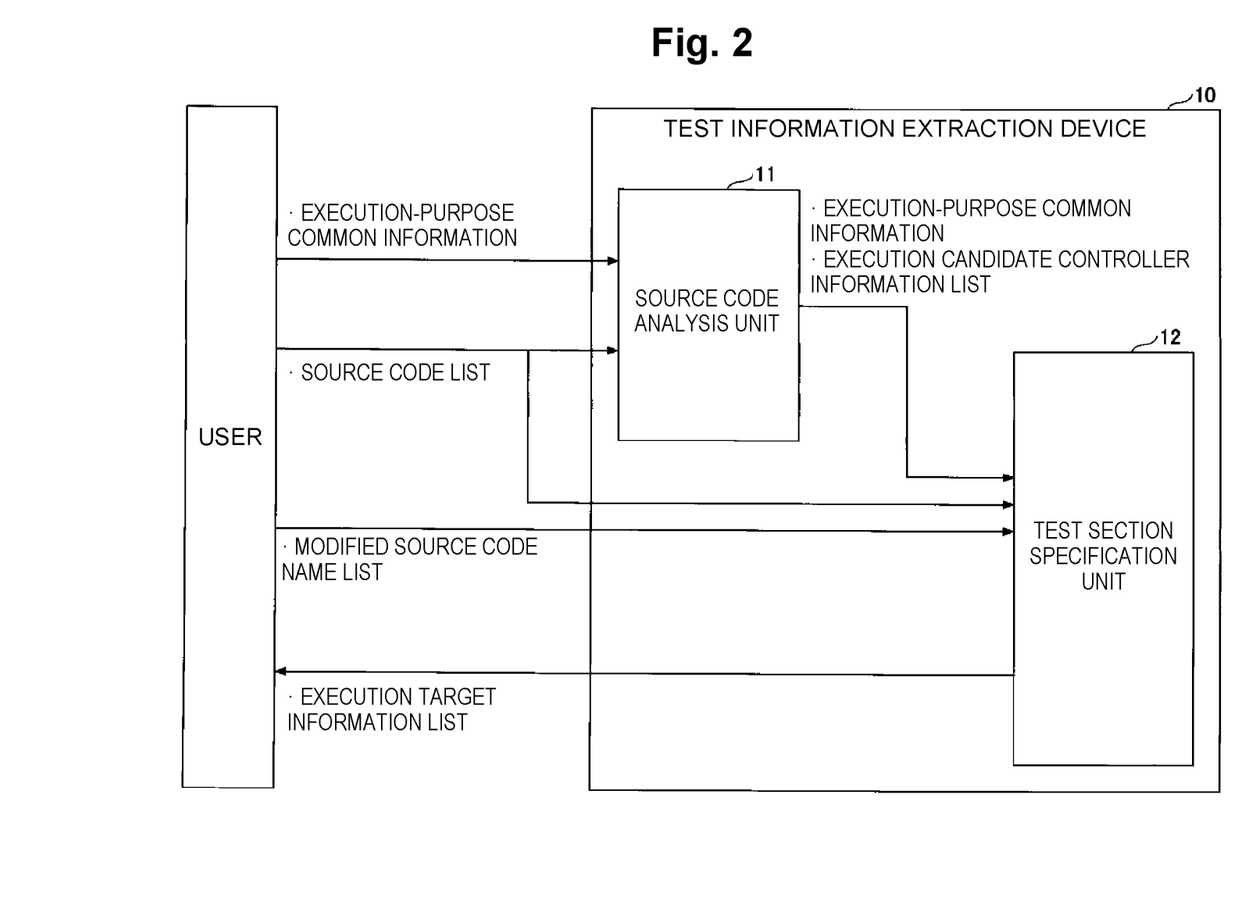
FIG. 2 is a diagram showing an example of a functional configuration of the test information extraction device 10 according to the embodiment of the present invention.

FIG. 2 is a diagram showing an example of a functional configuration of the test information extraction device 10 according to the embodiment of the present invention. In FIG. 2, the test information extraction device 10 includes a source code analysis unit 11 and a test section specification unit 12. These units are realized as a result of processes which the CPU 104 is caused to execute by one or more programs installed in the test information extraction device 10.

Next, a processing procedure performed by the test information extraction device 10 will be explained. The following will describe definitions of a data structure used in the explanation of the processing procedure presented below, on the basis of a Backus-Naur Form (BNF) method.

Figure 3:
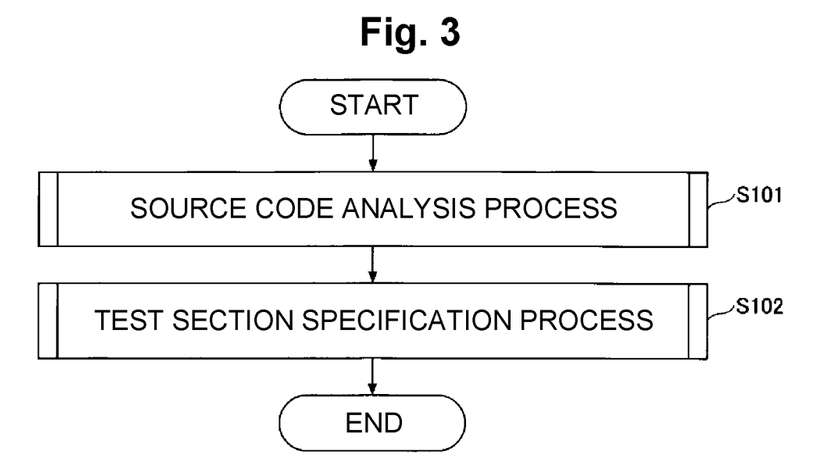
FIG. 3 is a flowchart for explaining an example of a processing procedure performed by the test information extraction device 10.

<Data Generated by the Source Code Analysis Unit 11>
Execution-purpose common information::=path:String
Execution candidate controller information list::=sourceCodeName:String execution candidate controller information*
Execution candidate controller information::=path:String execution candidate method information+
Execution candidate request information::=methodSignature:String method:String path:String header:String parameter list
Parameter list::=parameter*
Parameter::=name:String
<Data Generated by the Test Section Specification Unit 12>
Execution target information list::=execution target information+
Execution target information::=Execution-purpose common information Execution candidate controller information Execution candidate request information FIG. 3 is a flowchart for explaining an example of a processing procedure performed by the test information extraction device 10.

In step S101, the source code analysis unit 11 performs a source code analysis process on an application to be tested (hereinafter, "target app").

Subsequently, the test section specification unit 12 performs a test section specification process on the target app (S102).

Figure 4:
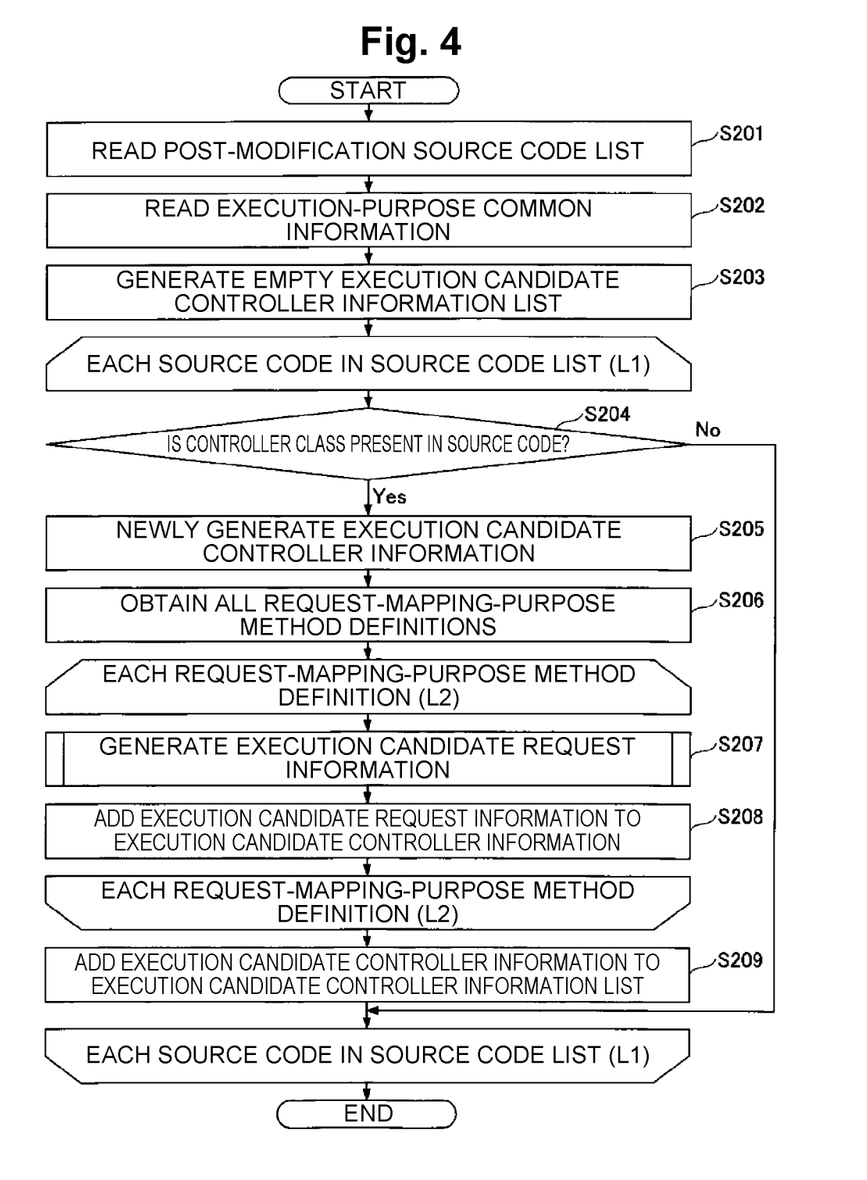
FIG. 4 is a flowchart for explaining an example of a processing procedure in a source code analysis process.

Next, details of step S101 will be explained. FIG. 4 is a flowchart for explaining an example of a processing procedure in the source code analysis process.

In step S201, the source code analysis unit 11 reads a list of source codes of the target app into the memory device 103. Within the source code list, a part of the source codes is post-modification source codes. Note that, the group of source codes is stored in the auxiliary storage device 102, for example. Note that, in the present embodiment, specific examples of the steps in each flowchart will be explained by using the situation where the source codes are structured in the Spring framework of Java (registered trademark) (a framework in which a web application can be structured by using an MVC model). However, the concept of the present embodiment is basically applicable to other situations where the source codes are structured on the basis of other frameworks.

Subsequently, the source code analysis unit 11 reads the execution-purpose common information (S202). The execution-purpose common information is data of a character-string type and is represented by a character string in a common part in the URL of an HTTP request to the target app. More specifically, for example, the execution-purpose common information is a character string such as "http://<host name or IP address>". In other words, the execution-purpose common information is dependent on the position in which the target app is arranged in the network, and cannot be identified from the source codes. Accordingly, the execution-purpose common information is input by a user.

After that, the source code analysis unit 11 generates an empty execution candidate controller information list (S203).

Subsequently, for each of source codes structuring the list read in step S201, a loop process L1 is performed with respect to steps S204 through S209. The source code serving as a processing target in the loop process L1 will hereinafter be referred to as a "target source code".

In step S204, the source code analysis unit 11 determines whether or not a controller class is present in the target source code. The determination process corresponds to determining whether or not the target source code is a source code of a controller. For example, when the target source code includes @Controller as an annotation, the source code analysis unit 11 determines that the controller class is present. Otherwise, the source code analysis unit 11 determines that the controller class is not present.

When the controller class is present in the target source code (S204: Yes), the processes in step S205 and thereafter will be performed. Otherwise (S204: No), the processes in step S205 and thereafter will not be performed with respect to the target source code.

In step S205, the source code analysis unit 11 newly generates execution candidate controller information. For example, the source code analysis unit 11 sets an argument value of annotation@RequestMapping with a path of the execution candidate controller information. Hereinafter, the execution candidate controller information will be referred to as "target controller information". Note that, the execution candidate controller information is information about a controller that becomes an execution candidate in response to a request received via the network.

Subsequently, the source code analysis unit 11 obtains all the request-mapping-purpose method definitions in a class definition of the controller of the target source code (S206). For example, it is possible to determine that any method definition (the content of the definition of the method) including @RequestMapping as an annotation is a request-mapping-purpose method definition. Accordingly, the source code analysis unit 11 obtains all the method definitions that each include @RequestMapping as an annotation, as the request-mapping-purpose method definitions.

After that, the source code analysis unit 11 performs a loop process L2 with respect to steps S207 and S208, for each of the request-mapping-purpose method definitions obtained in step S206. The request-mapping-purpose method definition serving as a processing target in the loop process L2 will be referred to as a "target method definition".

In step S207, the source code analysis unit 11 obtains, from within the target method definition, information necessary for executing the target app from the outside (information necessary for generating an HTTP request to call the method of the controller of the target app) and further generates execution candidate request information on the basis of the obtained information. Details of step S207 will be explained later.

Subsequently, the source code analysis unit 11 adds the generated execution candidate request information to the target controller information (S208).

When the loop process L2 is finished, the source code analysis unit 11 adds the target controller information to the execution candidate controller information list (S209).

Figure 5:
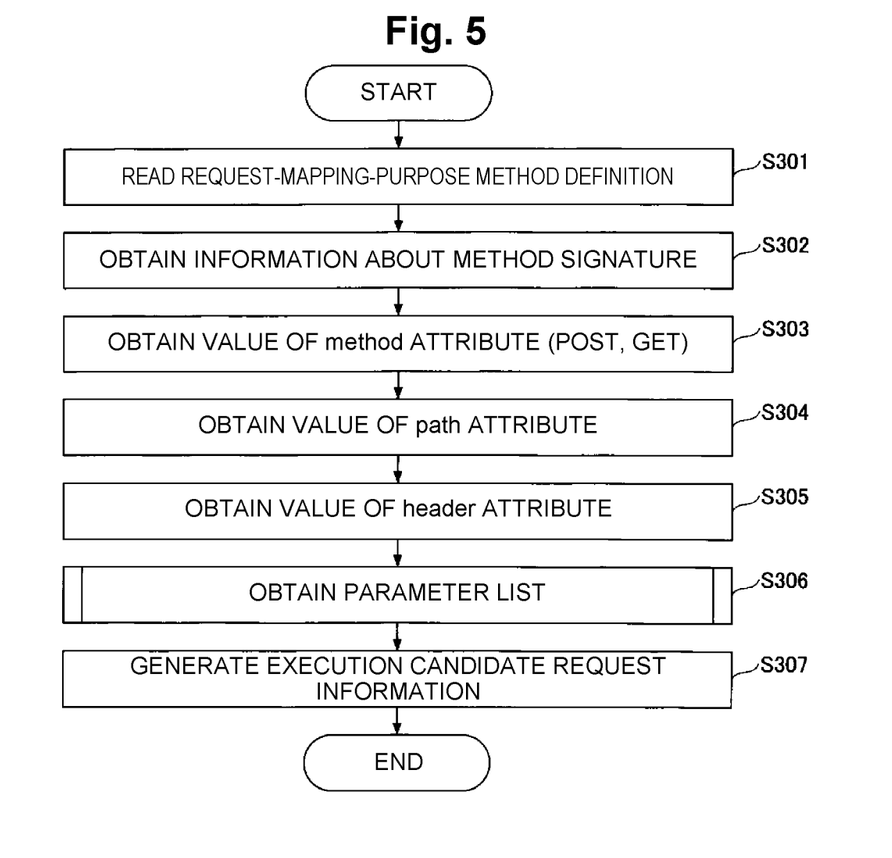
FIG. 5 is a flowchart for explaining an example of a processing procedure in a process of generating execution candidate request information.

Next, details of step S207 will be explained. FIG. 5 is a flowchart for explaining an example of a processing procedure in the process of generating the execution candidate request information.

In step S301, the source code analysis unit 11 reads the target method definition into the memory device 103. After that, the source code analysis unit 11 reads the target method definition.

Subsequently, the source code analysis unit 11 obtains information about a method signature (methodSignature) from within the target method definition (S302). The information about the method signature is a character string obtained by joining together all of the following: a name space, a class name, a method name, and a type name of a method argument. For instance, an example of the information about the method signature may read as follows: "PackageA.BalanceController.check(java.lang.String)".

After that, the source code analysis unit 11 obtains the value of a method attribute (POST, GET) from within the target method definition (S303). More specifically, the source code analysis unit 11 obtains one arbitrary value (POST, GET) from a method attribute serving as a parameter of the @RequestMapping annotation of the method.

Subsequently, the source code analysis unit 11 obtains the value of a path attribute from within the target method definition (S304). More specifically, the source code analysis unit 11 obtains one arbitrary value from the parameter "value" of the @RequestMapping annotation of the method.

After that, the source code analysis unit 11 obtains the value of a header attribute from the target method definition (S305). More specifically, the source code analysis unit 11 obtains one arbitrary value from the parameter headers attribute of the @RequestMapping annotation of the method.

Subsequently, the source code analysis unit 11 obtains a parameter list from within the target method definition (S306). Details of step S306 will be explained later.

After that, on the basis of the information obtained in steps S302 through S306, the source code analysis unit 11 generates execution candidate request information (Execution candidate request information::=methodSignature: String method:String path:String header:String parameter list) (S307).

Figure 6:
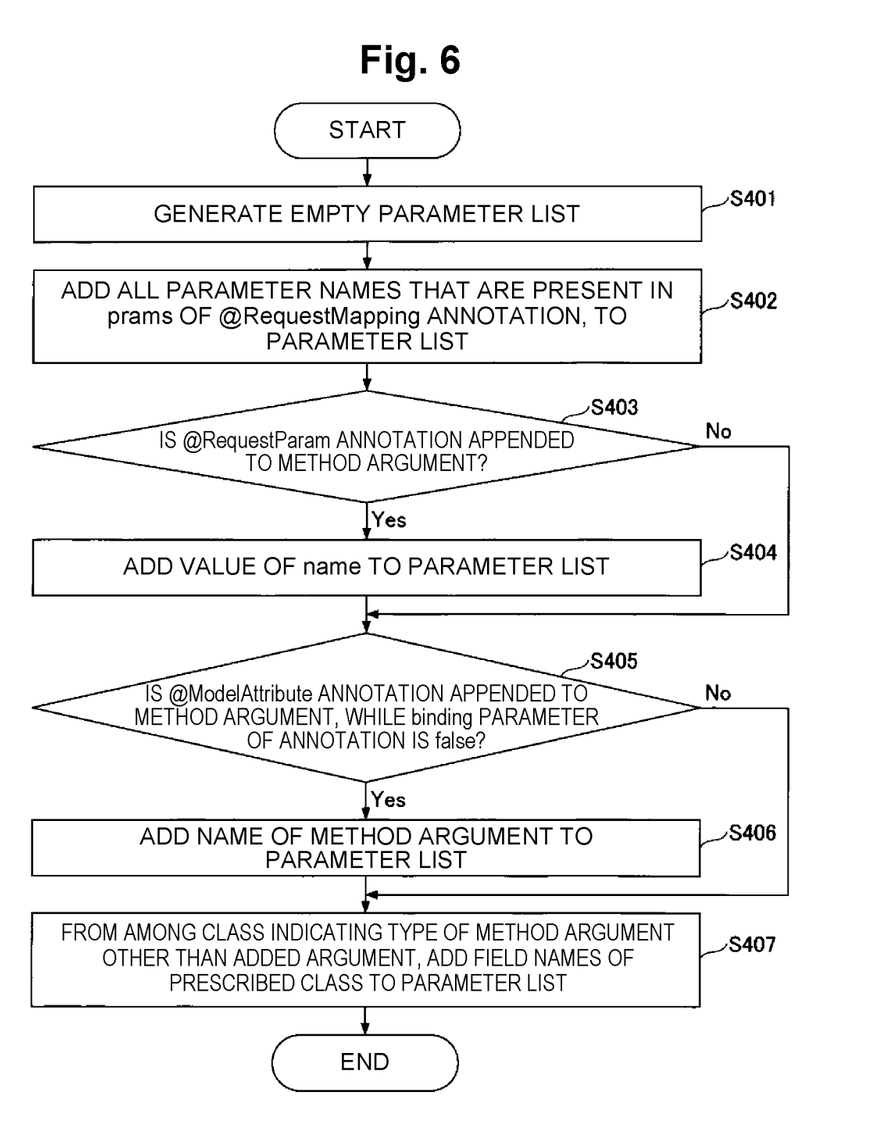
FIG. 6 is a flowchart for explaining an example of a processing procedure in a parameter list obtainment process.

Next, details of step S306 will be explained. FIG. 6 is a flowchart for explaining an example of a processing procedure in the parameter list obtainment process.

In step S401, the source code analysis unit 11 generates an empty parameter list. Subsequently, the source code analysis unit 11 adds, to the parameter list, all the parameter names that are present in the parameter "prams" in the @RequestMapping annotation of the method (hereinafter, "target method") related to the target method definition (S402).

After that, if the argument of the target method has appended thereto an @RequestParam annotation (S403: Yes), the source code analysis unit 11 adds the value of the "name" of the annotation to the parameter list (S404).

Subsequently, if the argument of the target method has appended thereto an @ModelAttribute annotation, while the binding parameter of the annotation is false (S405: Yes), the source code analysis unit 11 adds the name of the target method argument to the parameter list (S406). Otherwise (S405: No), the source code analysis unit 11 advances the process to step S407.

When the result of the determination in step S405 is in the negative ("No") or after step S406, the source code analysis unit 11 adds, to the parameter list, the field names (the attribute names) of all the fields (attributes) defined in a class as follows (S407): A class that is among the type (class) of a specific argument as follows and is not accompanied by an @AuthenticationPrincipal annotation. Here, the specific argument denotes an argument that is among the arguments of the target method and is other than the argument added to the parameter list in step S404 or S406.

Figure 7:
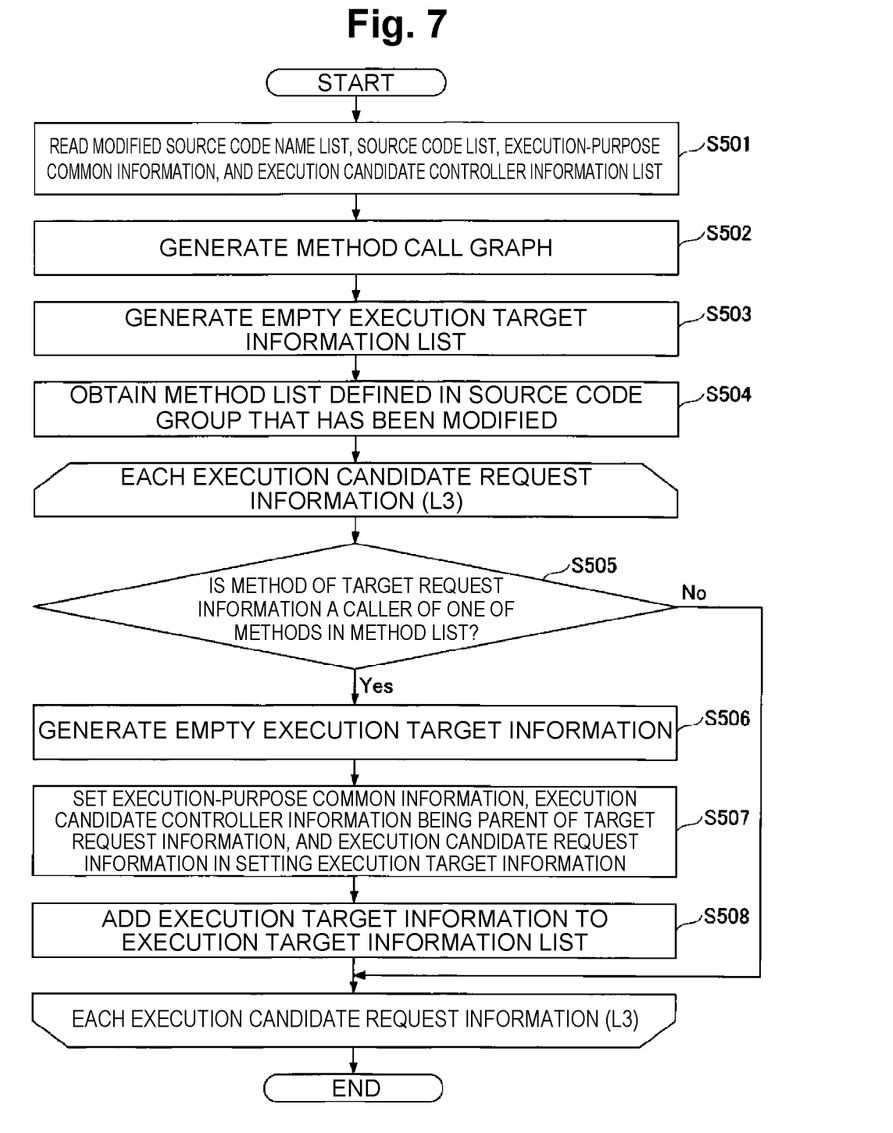
FIG. 7 is a flowchart for explaining an example of a processing procedure in a test section specification process.

Next, details of step S102 in FIG. 3 will be explained. FIG. 7 is a flowchart for explaining an example of a processing procedure in the test section specification process.

In step S501, the test section specification unit 12 reads, into the memory device 103, a modified source code name list, a source code list, execution-purpose common information, and an execution candidate controller information list. Here, the source code list denotes a list of the content of the definitions of the source codes of the target app. In this list, the source code names (source file names) are kept in association with the content of the definitions. Further, the modified source code name list denotes a list of the names (source file names) of modified source codes among the group of source codes of the target app and is input by the user. The execution-purpose common information is the same as the information input to the source code analysis unit 11. The execution candidate controller information list is the list generated by the source code analysis unit 11.

After that, the test section specification unit 12 generates a method call graph by analyzing the content of the definitions of the source codes included in the source code list (S502). The method call graph is a directed graph expressing call relationships among the methods.

Subsequently, the test section specification unit 12 generates an empty execution target information list (S503).

After that, the test section specification unit 12 obtains a list of methods (hereinafter, "target method list") defined in the source codes which are, among the source code list, included in a partial source code group (i.e., the group of modified source codes) and of which the source code names are included in the modified source code name list (S504).

Subsequently, the test section specification unit 12 performs a loop process L3 with respect to steps S505 through S507, for each of the pieces of execution candidate request information included in the execution candidate controller information list. The piece of execution candidate request information serving as a processing target in the loop process L3 will be referred to as "target request information".

After that, by referring to the method call graph, the test section specification unit 12 determines whether or not the method related to the target request information directly or indirectly calls any of the methods in the target method list (S505). In this situation, the determination is made by determining whether or not the method related to the target request information is a direct or indirect caller of any of the methods in the target method list. In other words, the test section specification unit 12 determines whether or not the method related to the target request information reaches any of the methods in the target method list, by following directional branches extending from the method related to the target request information.

When the method related to the target request information directly or indirectly calls any of the methods in the target method list (S505: Yes), the test section specification unit 12 extracts information used for generating an HTTP request corresponding to the method related to the target request information by performing steps S506 through S508. Otherwise (S505: No), steps S506 through S508 will not be performed.

In step S506, the test section specification unit 12 generates empty execution target information. After that, the test section specification unit 12 sets, in the execution target information, the execution-purpose common information, execution candidate controller information being a parent of the target request information (including the target request information), and the execution candidate request information (S507). Subsequently, the test section specification unit 12 adds the execution target information to the execution target information list (S508).

Note that, the output (the execution target information list) obtained by the test section specification unit 12 may be used for generating an HTTP request for testing code modified sections in a pinpoint manner, by performing procedures 1, 2, 3, and 4 as described below, for example, so as to be utilized in generating and executing a test case.

Procedure 1: An execution target URL is generated by joining together, from the execution target information, the path of the execution-purpose common information, the path of the execution candidate controller information, and the path of the execution candidate controller information.

Procedure 2: From the execution candidate request information of the execution target information, the method (information indicating whether GET or POST), the header, and a group of parameters are extracted.

Procedure 3: An HTTP request is generated by using the execution target URL, the method, the header, the group of parameters, and parameter values. (The values of the parameters are manually set or automatically set (with reference to, for example, "T. Y. Chen, H. Leung, and I. K. Mak, 2004, Adaptive random testing. In Proceedings of the 9th Asian Computing Science conference on Advances in Computer Science: dedicated to Jean-Louis Lassez on the Occasion of His 5th Cycle Birthday (ASIAN '04), Michael J. Maher (Ed.). Springer-Verlag, Berlin, Heidelberg, 320-329. DOI=http://dx.doi.org/10.1007/978-3-540-30502-6 23" (hereinafter, "reference document 1"))).

Procedure 4: A test is performed by accessing the test target application by using the HTTP request obtained with procedure 3.

As explained above, according to the present embodiment, it is possible to improve the efficiency of the testing of the application.

More specifically, according to the present embodiment, the analysis does not take a long time because the test is not created by crawling the entire application. Further, because it is possible to obtain the information used for testing only the modified sections of the source codes, developers are able to generate a required minimum test on the basis of the obtained information, by utilizing the technique (reference document 1) for generating the test data manually or automatically, and the like. Consequently, by testing the code modified sections in a pinpoint manner, it is possible to release the software promptly.

Further, according to the present embodiment, it is possible to obtain the information used for testing the code modified sections, by performing only the static analysis of the source codes. Consequently, the information used for performing the test is obtained even when there is no execution environment for the tested software. As a result, it is possible to save the trouble of preparing the execution environment.

Note that, in the present embodiment, the source code analysis unit 11 is an example of the obtainment unit. The test section specification unit 12 is an example of the extraction unit.

Certain embodiments of the present invention have thus been explained in detail. The present invention, however, is not limited to those specific embodiments. It is possible to apply various modifications and changes thereto within the scope of the gist of the present invention set forth in the claims.

REFERENCE SIGNS LIST

10 Test information extraction device
11 Source code analysis unit
12 Test section specification unit
100 Drive device
101 Recording medium
102 Auxiliary storage device
103 Memory device
104 CPU
105 Interface device
106 Display device
107 Input device
B Bus

The invention claimed is:

1. A test information extraction device comprising a processor configured to execute a method comprising:
obtaining, from a first source code group of an application that implements methods corresponding to requests of a plurality of types received via a network, first information used for generating the requests; and
specifying, from among the methods implemented in response to the requests, a method being a caller of a method included in a second source code group being a part of the first source code group and that further extracts, from the first information, second information used for generating one of the requests corresponding to the specified method.

2. The test information extraction device according to claim 1, wherein
the application is based on a Model-View-Controller (MVC) model, and the processor further configured to execute a method comprising:
extracting the first information from a source code group of a controller of the application.

3. The test information extraction device according to claim 2, the processor further configured to execute a method comprising:
generating a method call graph on a basis of the first source code group; and
specifying, from among the methods implemented in response to the requests, the method being the caller of the method included in the second source code group, on the basis of the method call graph.

4. The test information extraction device according to claim 1, the processor further configured to execute a method comprising:
generating a method call graph on a basis of the first source code group; and
specifying, from among the methods implemented in response to the requests, the method being the caller of the method included in the second source code group, on the basis of the method call graph.

5. A computer-implemented method for extracting test information, the method comprising:
obtaining, from a first source code group of an application that implements methods corresponding to requests of a plurality of types received via a network, first information used for generating the requests; and
specifying, from among the methods implemented in response to the requests, a method being a caller of a method included in a second source code group being a part of the first source code group and further extracting, from the first information, second information used for generating one of the requests corresponding to the specified method.

6. The computer-implemented method according to claim 5, wherein
the application is based on a Model-View-Controller (MVC) model, and the method further comprising:
extracting the first information from a source code group of a controller of the application.

7. The computer-implemented method according to claim 6, the method further comprising:
generating a method call graph on a basis of the first source code group; and
specifying, from among the methods implemented in response to the requests, the method being the caller of the method included in the second source code group, on the basis of the method call graph.

8. The computer-implemented method according to claim 5, the method further comprising:
generating a method call graph on a basis of the first source code group; and
specifying, from among the methods implemented in response to the requests, the method being the caller of the method included in the second source code group, on the basis of the method call graph.

9. A computer-readable non-transitory recording medium storing computer-executable program instructions that when executed by a processor cause a computer system to execute a method comprising:
obtaining, from a first source code group of an application that implements methods corresponding to requests of a plurality of types received via a network, first information used for generating the requests; and
specifying, from among the methods implemented in response to the requests, a method being a caller of a method included in a second source code group being a part of the first source code group and further extracting, from the first information, second information used for generating one of the requests corresponding to the specified method.

10. The computer-readable non-transitory recording medium according to claim 9, wherein the application is based on a Model-View-Controller (MVC) model, and the computer-executable program instructions when executed further causing the computer system to execute a method comprising:
extracting the first information from a source code group of a controller of the application.

11. The computer-readable non-transitory recording medium according to claim 10, the computer-executable program instructions when executed further causing the computer system to execute a method comprising:
generating a method call graph on a basis of the first source code group; and
specifying, from among the methods implemented in response to the requests, the method being the caller of the method included in the second source code group, on the basis of the method call graph.

12. The computer-readable non-transitory recording medium according to claim 9, the computer-executable program instructions when executed further causing the computer system to execute a method comprising:
generating a method call graph on a basis of the first source code group; and
specifying, from among the methods implemented in response to the requests, the method being the caller of the method included in the second source code group, on the basis of the method call graph.

* * * * *